J. T. THORNTON.
Draft Equalizers.
No. 100,469. Patented March 1, 1870.
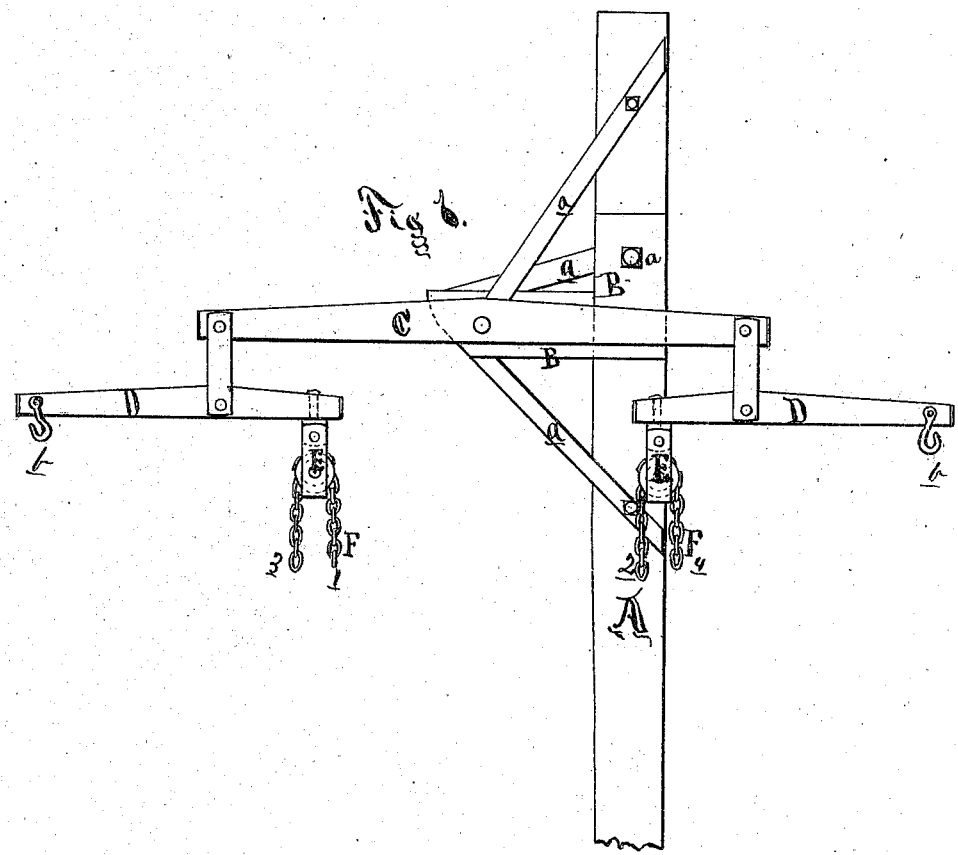
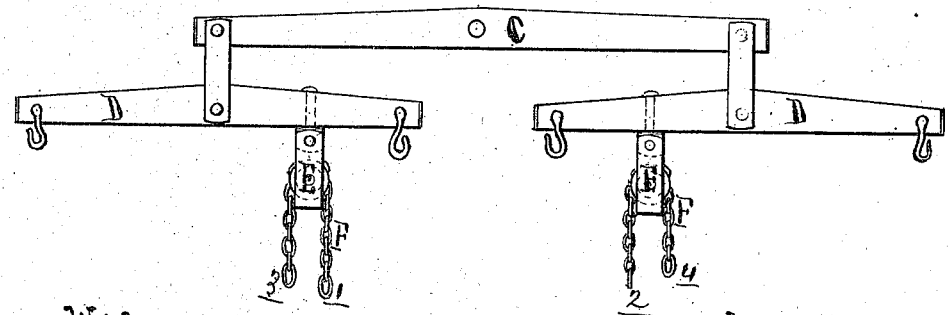

United States Patent Office.

JOHN T. THORNTON, OF KEWANEE, ILLINOIS.

IMPROVEMENT IN THREE-HORSE EQUALIZERS.

Specification forming part of Letters Patent No. 100,469, dated March 1, 1870; antedated February 26, 1870.

*To all whom it may concern:*

Be it known that I, JOHN T. THORNTON, of Kewanee, in the county of Henry and State of Illinois, have invented a new and useful Improvement in Three-Horse Equalizers; and I do declare that the following is a true and accurate description thereof, reference being had to the accompanying drawings, and to the letters of reference marked thereon, and being a part of this specification, in which—

Figure 1 is a plan view of my invention as attached to a tongue, and Fig. 2 is a plan view showing an adaptation to the common whiffletree to effect the same purpose.

The nature of this invention relates to an improvement in three-horse equalizers; and it consists in constructing the double-tree and whiffletrees in such a manner that, with the use of certain pulleys and chains, three horses can be attached to any vehicle, either with or without a tongue, and so arranged that each horse has an equal amount of labor to perform, as hereinafter more fully set forth.

In the drawings, A represents the tongue of a vehicle, to which is rigidly attached the offset B by bolts and braces $a$. The double-tree C is pivoted at its center to said offset, at a sufficient distance from the tongue to overcome the side draft in the use of three horses, which varies according to circumstances. To the outer ends of double-tree C are attached, in any proper manner, the single-trees D, in such a manner that the two outside traces will have two-thirds of the leverage. On the inner ends of the single-trees I attach the pulleys E by a swivel-hook provided with the chains F. The center horse is attached to the two inner ends of these chains 1 2, while the outside horses are attached to the hooks $b\ b$ and ends of the chains 3 4.

In attaching this device to any implement or vehicle in which the tongue is not used, it is to be done in the usual manner, without the use of any offset, thus giving each horse a direct path immediately in front of the implement in use. The reason for giving the outside traces the advantage of two-thirds of the single-trees, it will be seen, is a very important one, for the reason that four traces operate and are attached to the inner ends, while only two are attached to the outer ends; otherwise the outside traces would have the greater portion of the work to perform, owing to the amount of leverage over them. By attaching swivel-hooks and pulleys to the ordinary whiffletree half-way between their pivots and inner ends, the same effect is obtained, as shown in Fig. 2.

What I claim as my invention, and desire to secure by Letters Patent, is—

In combination with a pole, A, the offset B, double-tree C, single-tree D, pulleys E, and chains F, constructed, arranged, and operating substantially as and for the purposes set forth and shown.

JOHN T. THORNTON.

Witnesses:
 N. H. PRATT,
 J. E. WHYBROW.